UNITED STATES PATENT OFFICE.

GEORGE W. WILLIAMSON, OF GOLDSBOROUGH, PENNSYLVANIA, ASSIGNOR TO HIMSELF AND GEO. W. N. YOST.

IMPROVED COMPOSITION FOR LINING OIL-BARRELS.

Specification forming part of Letters Patent No. 43,552, dated July 12, 1864.

*To all whom it may concern:*

Be it known that I, GEORGE W. WILLIAMSON, of Goldsborough, Luzerne county, in the State of Pennsylvania, have invented a new and Improved Lining for Petroleum-Oil Barrels or Casks to prevent them from leaking; and I do hereby declare that the following is a full and exact description thereof.

The nature of my invention consists in so preparing coal-tar, petroleum-tar, or pine-tar that it will form a strong adhesive mass when cold, and on being heated will become liquid, so that it may be poured through the bung of the barrel, and by proper handling, so as to bring it in contact with all sides of the barrel, will form a sufficient coating, that will be strong and adhesive and resist the action of the oil or water that may be in it, and thereby prevent the barrel from leaking. Heretofore great loss and inconvenience have been sustained from the want of a material that would accomplish the above object.

To enable those skilled in the art to make and use my invention, I will describe its preparation.

I place the tar in a kettle and put a fire under it to boil away a portion of the fluid part; or it may be placed in a box with gas or steam pipes. Steam admitted into the pipe and boiled in that manner may be used with less danger from taking fire. After the tar is boiled down, so as to harden on cooling, I mix with it while boiling (to give it sufficient body for the purpose intended) calcined plaster or pulverized charcoal, or clay calcined and made fine; or I may use black oxide of manganese. Either of the above may be used; but I prefer the calcined plaster. The object of adding some one of either of the above or other suitable substances is to assist in forming a body strong and adhesive enough to make a sufficient coating that will expand with the heat and contract with the cold without cracking, and will not become fluid by the heat of the sun, but will remain a firm coating, sufficient to prevent leakage.

Barrels prepared in this manner are intended principally for holding crude petroleum-oil. This can be placed in my prepared casks and be exposed to the sun or be transported from port to port without leakage. The refined petroleum-oil may also be stored without danger of leaking; but if it be kept in a cask for a long time exposed to the sun the coating will be partially dissolved, so as to slightly discolor the oil. When oil in a pure state is to be put into the barrels it would be well to put more of the material used for the "body" into the tar, and to boil down the tar somewhat harder than when used for crude oil. It is also desirable to mix some soluble substance, which is insoluble in pure petroleum, with the boiled tar, for the purpose of preparing the cask for holding the pure oil. The cheaper kinds of glue or gelatine, &c., will answer this purpose.

Having thus described my invention, what I claim as new, and desire to secure by Letters Patent, is—

The use of prepared petroleum-tar, coal-tar, or pine-tar for lining petroleum-oil barrels or vessels to prevent them from leaking.

GEORGE W. WILLIAMSON.

Witnesses:
V. C. CLAYTON,
Jo. C. CLAYTON.